US009581432B2

(12) United States Patent
Kennington et al.

(10) Patent No.: US 9,581,432 B2
(45) Date of Patent: *Feb. 28, 2017

(54) OBJECT DIMENSIONING SYSTEM AND RELATED METHODS

(71) Applicant: Quantronix, Inc., Farmington, UT (US)

(72) Inventors: Robert L. Kennington, Farmington, UT (US); Eve A. Carlsruh, Layton, UT (US); Craig R. Bailey, Mantua, UT (US); Marie L. Midboe, Salt Lake City, UT (US); Brandon M. Taylor, Fruit Heights, UT (US); Randy B. Neilson, Syracuse, UT (US)

(73) Assignee: Quantronix, Inc., Farmington, UT (US)

( * ) Notice: Subject to any disclaimer, the term of this patent is extended or adjusted under 35 U.S.C. 154(b) by 23 days.

This patent is subject to a terminal disclaimer.

(21) Appl. No.: 14/579,901

(22) Filed: Dec. 22, 2014

(65) Prior Publication Data

US 2015/0103335 A1    Apr. 16, 2015

Related U.S. Application Data

(63) Continuation of application No. 13/366,901, filed on Feb. 6, 2012, now Pat. No. 8,928,896.

(Continued)

(51) Int. Cl.
*G01B 11/14*    (2006.01)
*G01B 11/02*    (2006.01)
(Continued)

(52) U.S. Cl.
CPC .............. *G01B 11/02* (2013.01); *G01B 11/14* (2013.01); *G01B 17/00* (2013.01); *G01G 19/002* (2013.01); *G01G 19/005* (2013.01)

(58) Field of Classification Search
CPC combination set(s) only.
See application file for complete search history.

(56) References Cited

U.S. PATENT DOCUMENTS 490,328 A    1/1893    Wallenstein
3,612,835 A    10/1971    Andrews et al.
(Continued)

FOREIGN PATENT DOCUMENTS

| JP | 08233538 A | 9/1996 |
| JP | 09049711 A | 2/1997 |
| JP | 2005069910 A | 3/2005 |

OTHER PUBLICATIONS

International Search Report for International Application No. PCT/US2012/023967 dated Sep. 12, 2012, 3 pages.
(Continued)

*Primary Examiner* — Tri T Ton
(74) *Attorney, Agent, or Firm* — TraskBritt

(57) ABSTRACT

A method and apparatus for dimensioning and, optionally, weighing an object. A platform with a surface is used for supporting an object. A user selects between two different dimensioning devices of the apparatus. The first device employs three distance sensors to determine a distance between each of the distance sensors and a side of an object. The second device includes a movable gate that is passed over and about an object or objects on the platform. Sensor arrays, such as paired, aligned light emitter and receiver arrays, are used in combination with a plurality of sensed gate positions to determine the dimensions of the objects(s) as the gate passes around the object(s) based on whether or not light from an emitter on one side of the gate reaches a light receiver on another, opposing side of the gate.

24 Claims, 14 Drawing Sheets

Related U.S. Application Data

(60) Provisional application No. 61/440,700, filed on Feb. 8, 2011.

(51) Int. Cl.
*G01B 17/00* (2006.01)
*G01G 19/00* (2006.01)

(56) References Cited

U.S. PATENT DOCUMENTS

| | | |
|---|---|---|
| 4,574,899 A | 3/1986 | Griffin |
| 4,711,579 A | 12/1987 | Wilkinson |
| 4,773,029 A | 9/1988 | Claesson et al. |
| 5,042,015 A | 8/1991 | Stringer |
| 5,105,392 A | 4/1992 | Stringer et al. |
| 5,220,536 A | 6/1993 | Stringer et al. |
| 5,422,861 A | 6/1995 | Stringer et al. |
| 5,606,534 A | 2/1997 | Stringer et al. |
| 5,636,028 A | 6/1997 | Stringer et al. |
| 5,831,737 A | 11/1998 | Stringer et al. |
| 5,850,370 A | 12/1998 | Stringer et al. |
| 5,988,645 A | 11/1999 | Downing et al. |
| 6,049,386 A | 4/2000 | Stringer et al. |
| 6,064,629 A | 5/2000 | Stringer et al. |
| 6,298,009 B1 | 10/2001 | Stringer |
| 6,611,787 B2 | 8/2003 | Stringer et al. |
| D490,328 S | 5/2004 | Peterson et al. |
| 6,850,464 B2 | 2/2005 | Carlsruh |
| 7,038,764 B2 | 5/2006 | Lee |
| 7,073,940 B2 | 7/2006 | Saladin et al. |
| 7,277,187 B2 | 10/2007 | Smith et al. |
| 7,647,752 B2 | 1/2010 | Magnell |
| RE42,430 E | 6/2011 | Carlsruh et al. |

OTHER PUBLICATIONS

International Written Opinion for International Application No. PCT/US2012/023967 dated Sep. 12, 2012, 4 pages.
International Preliminary Report on Patentability for International Application No. PCT/US2012/023967 dated Aug. 22, 2013, 5 pages.

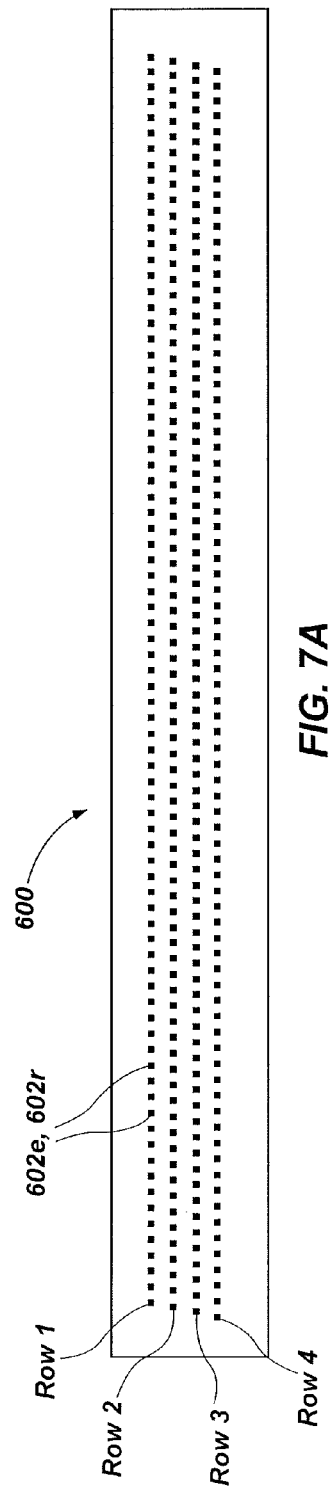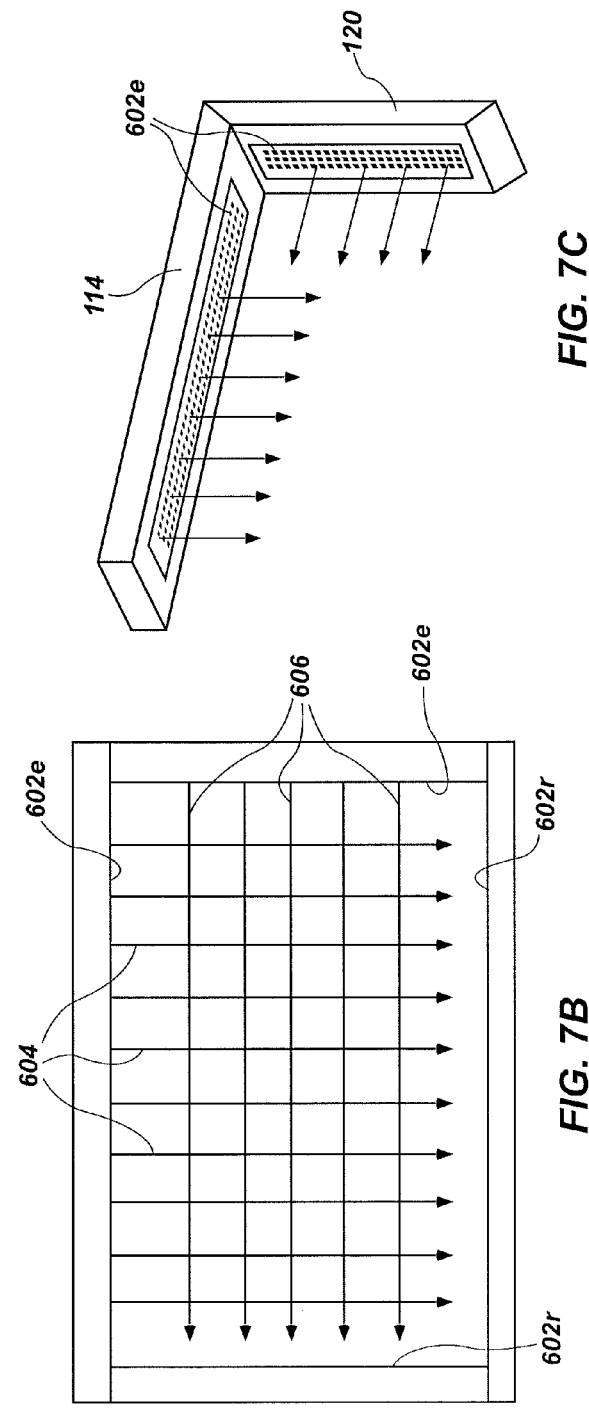
FIG. 7A
FIG. 7B
FIG. 7C

OBJECT DIMENSIONING SYSTEM AND RELATED METHODS

CROSS-REFERENCE TO RELATED APPLICATIONS

This application is a continuation of U.S. patent application Ser. No. 13/366,901, filed Feb. 6, 2012, now U.S. Pat. No. 8,928,896, issued Jan. 6, 2015, which claims the benefit of U.S. Provisional Patent Application Ser. No. 61/440,700, filed Feb. 8, 2011, the disclosure of each of which is hereby incorporated herein in its entirety by this reference.

FIELD

Embodiments of the present disclosure relate generally to methods and apparatus for taking dimensional measurements of objects.

BACKGROUND

Millions of packages per year are handled and shipped by United Parcel Service, Federal Express, and many other smaller courier and delivery services. These packages originate with federal, state, and local governments as well as private businesses of all sizes. In many instances, the charges by the carriers to their customers are based on the so-called "dim-weight factor" or "dimensional weight factor" (DWF) of the article being shipped, a fictitious dimension based on length (L) times width (W) times height (H) in inches divided by a standard agency or association-recognized divisor or conversion factor, commonly 139 (L×W×H)/139) for international shipments and 166 (L×W×H)/166) for domestic U.S. shipments. The "139" and "166" divisors or conversion factors have been recognized and adopted by the International Air Transport Association (I.A.T.A.). Even if an object or package is of irregular configuration, the "dim weight," using the longest measurement each of length, width, and height, is still utilized for billing purposes. The volume computed by multiplication of object length, times width, times height may hereinafter be termed the "cubic volume," "spatial volume," or simply the "cube" of the object.

The measurements of the articles shipped are also critical so that the carrier can compute volume-based shipping charges; accurately determine the number of containers, trucks, trailers, or other vehicles required to transport goods to their destinations; and handlers of goods can optimize the use of space in retail as well as warehouse/distribution-center facilities. In addition, article weight and measurements may also be used to determine and predict weight and balance for transport vehicles and aircraft and to dictate the loading sequence for objects by weight and dimensions for maximum safety and efficiency. If orders of any items are to be packed into boxes, knowledge of object weight

BRIEF SUMMARY
and dimensions is useful for determining box size, durability, packing sequence and product orientation.

A quick, accurate means and method for determining the dimensions and the cubic volume or spatial volume of a variety of sizes of packages and other objects in a commercial or industrial setting has been lacking for some situations. There is a particular need to be able to accurately measure and weigh packages of varying dimensions and sizes using a single apparatus, including both small and large packages as well as irregularly shaped packages.

Embodiments of the present disclosure comprise an apparatus and method for determining the dimensions and, optionally, spatial volume and weight of an object.

The apparatus of the present disclosure, in one embodiment, includes a dimensioning system employing two different dimensioning technologies to measure objects in at least partially overlapping spatial volumes.

An embodiment of a dimensioning system includes a platform having a surface for supporting an object to be measured. The apparatus further includes a first dimensioning device and a second dimensioning device for measuring dimensions of an object or objects on the platform. The first dimensioning device comprises first, second and third mutually orthogonal distance sensors, the first distance sensor oriented to sense distance in a first direction orthogonal to the platform surface, and the second and third distance sensors oriented parallel to the platform surface. The three distance sensors are all aimed toward a common location. The second dimensioning device comprises a gate configured as a frame having an upper arm opposite a lower arm parallel thereto disposed at an elevation below the platform, and opposing side supports extending between the arms. The gate is mounted for movement about the platform. The arms of the gate respectively carry a plurality of mutually aligned emitters and receivers, and the supports of the gate respectively carry mutually aligned emitters and receivers.

An embodiment of an apparatus for dimensioning one or more objects comprises a substantially transparent platform surface, a first array of cooperative, horizontally mounted beam emitters and receivers and a second array of cooperative, vertically mounted beam emitters and receivers supported by structure positioned for movement about the platform, detecting interference of emitted beams by the object for a plurality of positions of the first array and second array; and calculating dimensions of the object from the detected beam interference corresponding to at least some of the plurality of positions of the first array and second array.

A method, according to one embodiment, includes placing an object on a substantially transparent platform surface and moving a first array of cooperative, horizontally mounted beam emitters and receivers above and below the platform surface and detecting interference of emitted beams by the object for a plurality of positions of the first array while concurrently moving a second array of cooperative, vertically mounted beam emitters and receivers with the object therebetween and detecting interference of emitted beams by the object for the plurality of positions, and subsequently calculating dimensions of the object from the detected beam interference corresponding to at least some of the plurality of positions.

A method, according to another embodiment, includes selecting one of a first and a second dimensioning device, wherein the first dimensioning device comprises first, second, and third mutually orthogonally oriented distance sensors aimed toward a common location over a substantially transparent platform and the second dimensioning device comprises structure bearing horizontally and vertically mounted cooperative beam emitters and receivers and mounted for movement about the platform, placing one or more objects on the platform, selecting one of the first dimensioning device and the second dimensioning device, and measuring dimensions of the one or more objects using the selected dimensioning device.

In further embodiments, the disclosure comprises a multi-row array of light emitter/receiver pairs configured for resolution finer than is obtainable using minimum obtainable physical spacing, and a method of strobing beam emitters of an array of emitter/receiver pairs comprising a plurality of offset rows in a pattern to avoid artifact in the form of false reception reading by beam receivers in close proximity.

In yet a further embodiment, light emitters and/or light receivers are employed in combination with physical masking filters to reduce cross-talk between light beams and artifact in sensing emitted light beams attributable to ambient light.

Other methods and apparatus are encompassed by the present disclosure, as set forth below in the detailed description.

BRIEF DESCRIPTION OF THE DRAWINGS

The present disclosure will be more fully understood by one skilled in the art through a review of the following detailed description of the preferred embodiments taken in conjunction with the accompanying drawings wherein:

FIG. 7A comprises a top view of one embodiment of an array of dimensioning sensors in accordance with one embodiment of the present disclosure;

FIG. 7B comprises a side elevation of one embodiment of a gate for carrying the dimensioning sensors of FIG. 6A;

FIG. 7C comprises a perspective view of one embodiment of an upper arm and a vertical support of the gate of FIG. 6B;

DETAILED DESCRIPTION

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations are not shown or described in detail to avoid obscuring aspects of the disclosure.

The schematic flow diagrams that follow are generally set forth as logical flowchart diagrams. As such, the depicted order and labeled acts are indicative of one embodiment of the disclosed method. Other acts and methods may be conceived that are equivalent in function, logic, or effect to one or more acts, or portions thereof, of the illustrated method. Additionally, the format and symbols employed are provided to explain the logical acts of the method and are understood not to limit the scope of the method. Although various arrow types and line types may be employed in the flowchart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated acts of the depicted method. Additionally, the order in which a particular method occurs may or may not strictly adhere to the order of the corresponding acts shown.

As used herein, the term "distance sensor" generally refers to electronic devices such as ultrasound devices, laser devices, or the like that are able to sense a distance between an object and the sensor. The term "dimensioning sensor" may refer to a distance sensor but may also refer to other types of sensors such as light emitter/light receiver pairs, laser devices, or the like that may be used to determine the dimensions of and/or map the surface of an object.

Figure 1:
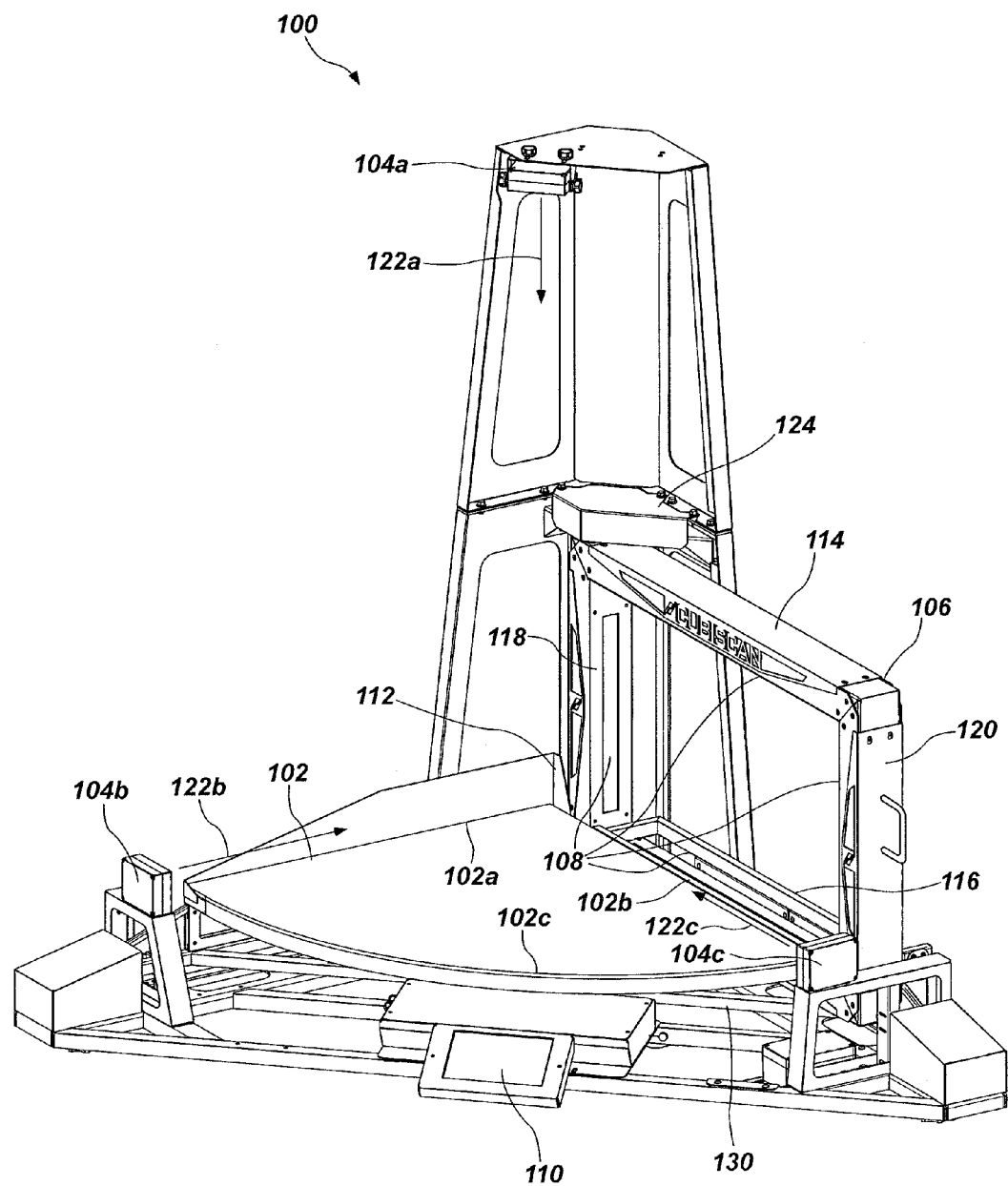
FIG. 1 comprises a perspective view of an embodiment of the present disclosure.
Figure 2A:
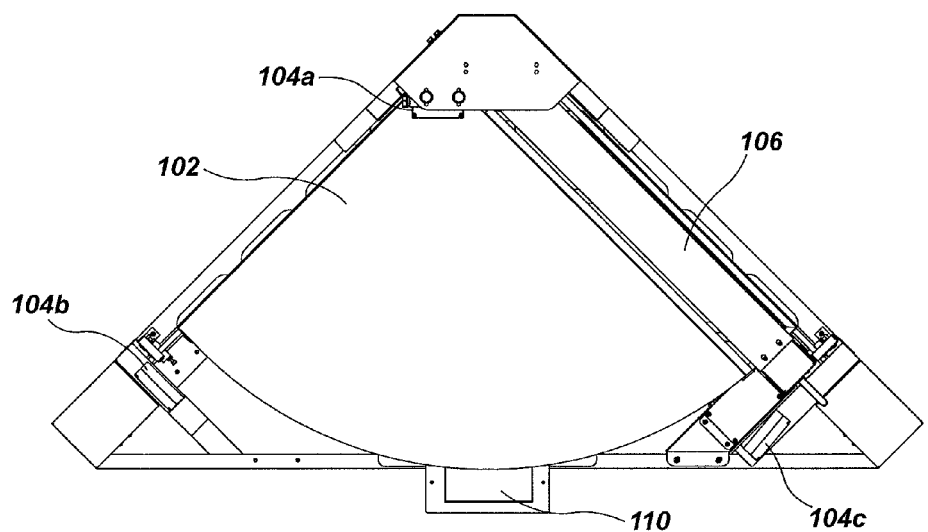
FIG. 2A comprises a top elevation of the embodiment of FIG. 1.
Figure 2B:
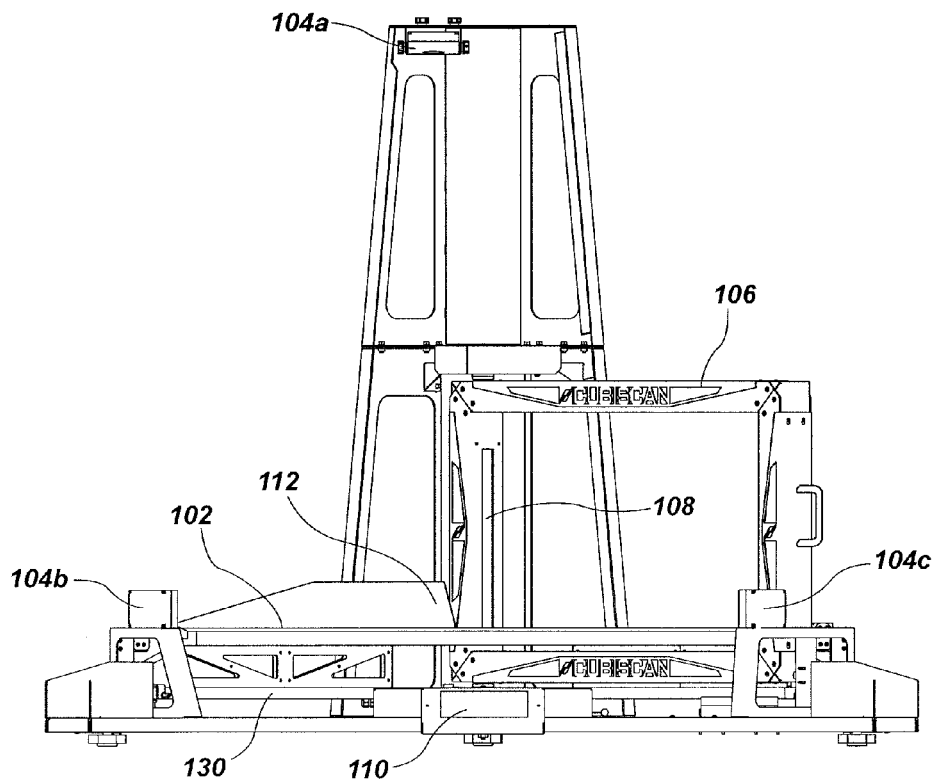
FIG. 2B comprises a front elevation of the embodiment of FIG. 1.
Figure 3:
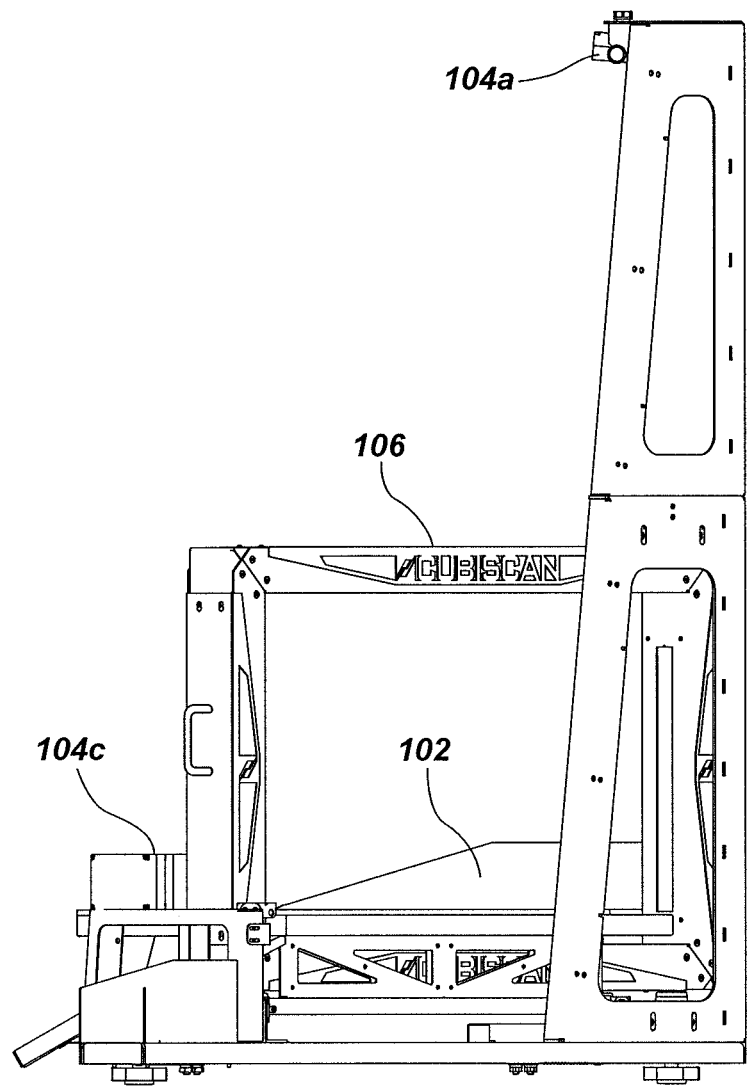
FIG. 3 comprises a side elevation of the embodiment of FIG. 1.

FIG. 1 comprises a perspective view of an embodiment of an apparatus 100 in accordance with the present disclosure. Generally, apparatus 100 is a dimensioning system that enables the use of multiple dimensioning technologies. The dimensioning system may be used for measuring and determining the dimension of many different sizes and types of objects. For example, a user may desire to obtain dimensional information of both relatively small, irregular-shaped objects with higher resolution, and of larger, cuboidal-shaped objects with somewhat lower resolution. The dual-measuring capability of apparatus 100 enables the measurement of small items such as nuts, bolts, and/or small boxes such as those used to package pharmaceuticals, books, electronic parts, etc., as well as the measurement of larger boxes or cartons. In many cases, a user may need dimensioning information for activities such as display planning, storage optimization, packing and load planning, and determination or estimation of shipping costs. In some instances, a user may also desire to utilize two different dimensioning technologies on the same object in order to ensure accuracy of the measurements by utilizing redundant measurements.

As depicted in FIGS. 1, 2A, 2B, 3, 4, 5A, 5B and 5C, apparatus 100 includes platform 102, a first dimensioning device that includes distance sensors 104a-104c, and a second dimensioning device that includes rectangular gate 106. The first dimensioning device utilizes distance sensors 104a-104c to determine a distance from each distance sensor 104a-104c to a facing surface of a cuboidal object situated on platform 102. The determined distance from each distance sensor 104a-104c to the facing surface of the cuboidal object may be used to determine the dimensions of the object. The first dimensioning device is useful for measuring both small and larger cuboidal objects. The second dimensioning device with the rectangular gate 106 is configured as a frame that is pivotally mounted about a vertical axis for movement in an arc across the platform 102. Rectangular gate 106 may be used to determine the dimensions of smaller cuboidal objects as well as smaller irregularly shaped objects which, when placed on platform 102, lie within the arc of movement of rectangular gate 106. Rectangular gate 106 may enable greater resolution of measurement than that obtainable by using distance sensors 104a-104c by using an array of dimensioning sensors 108 carried by the gate 106. The dimensioning sensors 108 are passed over, under and on opposing sides of an object or objects on platform 102 as gate 106 is moved through an arc over the platform 102 to determine the dimensions of the object or objects. As described below and with specific reference to FIGS. 7A through 7C, dimensioning sensors comprise rows of cooperatively aligned light emitters and receivers, in an arrangement which may be described as providing a "light curtain" of emitted beams.

Platform 102 has a planar surface for receiving and supporting objects to be measured. Platform 102 may be configured with a first linear edge 102a along one side and a second linear edge 102b along an adjacent side that is orthogonally adjoined at a corner to the first linear edge 102a. In the depicted embodiment, the platform 102 has a third curved edge 102c opposite the corner such that the surface of the platform 102 substantially forms a quarter-circle. A platform 102 of this shape enables a user to easily access the platform surface in order to place items on or remove items from the platform 102. The shape of platform 102 also enables rotation of the rectangular gate 106 in an arc across the platform 102, as hereinafter described. Of course, other shapes and configurations are also contemplated herein such as rectangular, square, trapezoidal or triangular shaped platforms, provided the platform shape and size employed provides clearance for movement of rectangular gate 106.

In one embodiment, platform 102 may comprise a transparent material such as glass, plexi-glass, transparent plastic, or the like. A transparent material enables radiant energy signals such as light signals to pass through the surface of platform 102 without substantial attenuation. For example, an upper arm 114 of the gate 106 may be situated above platform 102 and a lower arm 116 may be situated below platform 102. A light signal may pass from light emitters 602e (FIGS. 7A through 7C) carried by the upper arm 114 of the gate 106 through platform 102 to cooperatively aligned light receivers 602r (FIGS. 7A and 7B) carried by the lower arm 116 of the gate 106. Conversely, a light signal may pass from light emitters 602e carried by the lower arm 116 of the gate 106 through platform 102 to cooperatively aligned light receivers 602r carried by the upper arm 114 of the gate 106. As the lower arm 116 passes underneath the surface of the platform 102, the light receivers 602r receive the light signals from the light emitters 602e unless the signals are blocked or interrupted by an object on platform 102. In a further embodiment, platform 102 may be operably attached to a weight measuring device configured to measure a weight of an object or objects situated on the platform. For example, a device such as a strain gage scale may be used to determine an amount of weight of an object on the platform 102.

The first dimensioning device incorporated into the apparatus 100 includes a plurality of orthogonally oriented distance sensors 104a-104c. Each distance sensor 104a-104c determines a distance from the respective distance sensor 104a-104c to a near, perpendicular surface of a cuboidal object on the platform 102. In one embodiment, the distance sensors 104a-104c are ultrasound-based sensors, also characterized as ultrasonic sensors. The ultrasound sensors use ultrasound ranging technology to send a signal toward a cuboidal object on platform 102. Based on the signal reflecting from a facing surface of the object, the ultrasound sensors determine how far the facing surface of the cuboidal object is from the sensor 104a-104c. Ultrasonic sensors, also known as transceivers, operate by generating high frequency sound waves typically to above the normal range of human hearing. In accordance with one embodiment of apparatus 100, an ultrasound sensor sends an ultrasound signal toward a surface of a cuboidal object and monitors the amount of time elapsed before the ultrasound signal reflected off a surface of the cuboidal object returns to the ultrasound sensor. Based on the time of travel of the ultrasound signal before it returns to the ultrasound sensor, the object's distance from the sensor 104a-104c may be determined as known to those of ordinary skill in the art.

Ultrasound technology is extremely safe, emitting no radiation; visible, ultraviolet, or infrared light; audible sound; odor; or heat. Further, ultrasound, as used in accordance with apparatus 100, will not damage a package or its contents during the measurement operation. Finally, an ultrasonic distance sensor 104a-104c of the type utilized herein typically has no moving parts and is essentially maintenance free. The ultrasonic distance sensors 104a-104c disclosed herein may be electrostatic, although piezoelectric transducers or other transducers known in the art may be employed. In one embodiment, the electrostatic sensors operate at a frequency of 50 kHz. It is also contemplated that laser range finder-type distance sensors may be employed in lieu of ultrasonic distance sensors in implementing apparatus 100, but such an approach may be more complex and expensive.

In one embodiment, a first distance sensor 104a is disposed above the surface of platform 102 and oriented to sense distance in a first direction 122a orthogonal to the surface of platform 102. As depicted, the first distance sensor 104a directs a signal, such as an ultrasound signal, downward toward platform 102. The signal bounces off a first facing surface of a cuboidal object that is being measured (or off the surface of platform 102 if no object is present) and returns to the first distance sensor 104a. The second distance sensor 104b is oriented to sense a distance in a second direction 122b orthogonal to the first direction 122a and parallel with the platform surface. The second distance sensor 104b directs a signal in the second direction 122b toward a second facing surface of the object being measured. The signal bounces off the second surface of the object and returns to the second distance sensor 104b. Similarly, the third distance sensor 104c is oriented to sense a distance in a third direction 122c orthogonal to both the first direction 122a and orthogonal to the second direction 122b and parallel with the platform 102. The third distance sensor 104c directs a signal toward a third facing surface of the object being measured. The signal bounces off the third surface of the object being measured and returns to the second distance sensor 104b. By utilizing three directional ultrasound sensors 104a-104c, all three dimensions (length, width, height) of a cuboidal object can be determined.

In one embodiment, the measurements determined by the distance sensors 104a-104c may be subtracted from a known distance between the surface of platform 102 (or upstanding vertical surface at an edge of platform 102) and the corresponding distance sensors 104a-104c to determine a dimension of the object being measured. In one embodiment, the distance sensors 104a-104c are each oriented so that signals emitted from each distance sensor 104a-104c substantially converge at a mutual, also termed a common, point. As depicted, the distance sensors 104a-104c are oriented to converge directionally at the corner of platform 102. In some embodiments, the distance sensors 104a-104c may be offset slightly to ensure that the signals from each sensor are aligned with a surface of an object being measured and are not adversely affected by surfaces of apparatus 100. In further embodiments, the distance sensors 104a-104c may be configured to be adjustable or movable to better align with a surface of an object being measured. For example, a mounting bracket for the distance sensors 104a-104c may include an adjustment mechanism that enables each distance sensor 104a-104c to be repositioned or more accurately aligned with an object being measured and to avoid signal interference. In one embodiment, distance sensor 104a may be oriented at a skew angle of between about 9.5 degrees and about 11.5 degrees to the vertical, and distance sensors 104b and 104c may each be oriented at a skew angle in a horizontal plane of between about 1.8 degrees and 2.2 degrees.

Prior to operation of the distance sensors 104a-104c, a corner of the cuboidal object to be measured may be aligned with the corner of platform 102. In order to facilitate positioning of the object for use with the distance sensors 104a-104c, a corner stop 112 may be utilized. As depicted, the corner stop 112 rises vertically from and is attached to the corner of the platform 102. The corner stop 112 may include a first vertical surface and a second vertical surface wherein the first vertical surface is orthogonal to the second vertical surface and wherein the first vertical surface and second vertical surface are orthogonal to the surface of platform 102. The vertical surfaces of the corner stop 112 enable a cuboidal object to be positioned on the platform against the corner stop 112 to ensure accurate measuring of the object by the distance sensors 104a-104c.

In further embodiments, alignment markings may be included on the surface of the platform 102 to ensure proper alignment of the object being measured. In some embodiments, placement sensors may be used to indicate that the object is properly positioned on platform 102. For example, proximity sensors or touch sensors may be used to indicate that an object is in close proximity to or is touching each vertical surface of the corner stop 112. In one embodiment, the distance sensors 104a-104c may be configured to operate in response to an object being positioned against the sides of the corner stop 112. In another embodiment, an error signal may be generated if the object being measured is not properly positioned against the corner stop 112.

The second dimensioning device utilizes gate 106 to pass signals associated with sensors 108 attached to the gate 106 across one or more objects resting on platform 102. The second dimensioning device does not require that the object be placed in any particular position on the platform, other than that objects be placed on portions of the platform 102 which are unobscured by the frame supporting the glass or other transparent material of the platform 102, and outside of a small portion of platform 102 at the left-hand end of the arc of gate travel that sensors 108 will not reach. Rather, the objects simply must be of a small enough size to pass through the gate 106. Stated another way, when gate 106 is traversed over its arc of travel, gate 106 must be able to pass over the object or objects on platform 102 without interference. Of course, in various embodiments, the gate 106 may be configured in different shapes and sizes to accommodate different types of objects. The second dimensioning device is particularly useful for accurately measuring smaller objects or for measuring irregular objects.

As depicted, the gate 106 is rectangular in shape and is configured as a frame having an upper horizontal arm 114 opposite a lower horizontal arm 116 and having a first vertical support 118 opposite a second vertical support 120. The gate 106 may be attached by a hinge 124 to a support structure of apparatus 100 to enable the gate 106 to pivot or rotate horizontally with respect to platform 102 about a vertical axis. Rotating the gate 106 causes the upper arm 114 and lower arm 116, respectively, to pass over and under platform 102. An object situated on platform 102 is passed between the upper arm 114 and lower arm 116 as the gate 106 is rotated. Similarly, the object is concurrently passed between the first vertical support 118 and second vertical support 120 as the gate 106 is rotated. The gate 106 includes a plurality of dimensioning sensors 108 on a surface of one or more of the upper arm 114, lower arm 116, first vertical support 118, and second vertical support 120. Outputs from the plurality of sensors 108, in combination with positional data associated with a plurality of positions of the gate 106 may be employed to determine dimensions of the object or objects being measured.

In one embodiment, see FIGS. 1 and 7A through 7C, the plurality of dimensioning sensors 108 includes a plurality of light emitters 602e configured, for example, as light emitting diodes (LEDs), on the upper arm 114 or the lower arm 116. A corresponding plurality of associated light receivers 602r may be respectively aligned on the other of upper arm 114 and lower arm 116 such that a light signal passes from each light emitter 602e on one arm to a corresponding light receiver 602r on an opposing arm. For example, one or more rows of light emitters 602e may be positioned along the length of the upper arm 114 and may be oriented to emit beams of light down toward similarly positioned light receivers 602r on lower arm 116. As another example, one or more rows of light emitters 602e may be positioned along the length of the lower arm 116 and may be oriented to emit beams of light upward toward similarly positioned light receivers 602r on the upper arm 114. In a like manner, one or more vertically oriented rows of light emitters 602e may be positioned on one of first vertical support 118 and second vertical support 120 of the gate 106 and one or more corresponding vertically oriented rows of light receivers 602r may be positioned and respectively aligned on the other of first vertical support 118 and second vertical support 120. The light emitters 602e on one support, pass light signals to the light receivers 602r on the other vertical support. In such a configuration, the light emitter/receiver pairs are configured, when activated, to form a vertical light curtain 604 of discrete, laterally separated signals (between the upper arm 114 and the lower arm 116) and a horizontal light curtain 606 of discrete, laterally separated signals (between the first vertical support 118 and the second vertical support 120).

As the gate 106 is rotated across platform 102, an object situated on platform 102 passes through the vertical and horizontal light curtains 604, 606. The object passing through the light curtains 604, 606 causes interruptions in communication between some of the emitters 602e and their corresponding receivers. Data regarding the rotational position of the gate 106 and the corresponding interruptions in communication between light emitters 602e and receivers 602r is recorded. Based on a plurality of rotational positions of the gate 106 in conjunction with the detected interruption of emitted signals associated with each gate position, the dimensions of even irregular objects can be accurately determined. Thus, each rotational position of the gate 106 corresponds to a "slice" of the object being measured. The "slices" can be pieced together through computing operations, as known to those of ordinary skill in the art, to determine a mapping of the overall size and shape of the object being measured. From this information, the dimensions of the object may be output to a display for another device such as a computer, or printer, or to multiple devices. The use of additional light emitter/receiver pairs or additional, laterally adjacent rows of light emitter/receiver pairs may be used to increase resolution and provide more accurate measurements and mapping of objects on platform 102.

In one embodiment, a rotational sensor such as a tachometer, rotary encoder or similar device is used to detect a rotational position of the gate 106. The rotational sensor may be configured to generate an electrical signal or to record electronic data that enables correlation of the rotational position of the gate 106 with obstructed light emitter signals that are recorded as the gate 106 is rotated. During rotation of the gate 106, the gate 106 passes through a plurality of positions. As noted, corresponding interruptions of light signals traveling between emitter/receiver pairs are recorded for each gate position. A greater number of more finely incremented gate positions 106 may correlate to an increased resolution of dimension measurements. Thus, resolution of the second dimensioning system may be increased by increasing the number of rotational positions used for the gate 106 and/or increasing the number of light emitter/receiver pairs that are used.

In one embodiment, rotational movement of gate 106 is manually effected, and gate position is determined as described in the preceding paragraph. In another embodiment, gate movement may be effected by a stepper or a servo motor upon initiation by an operator (for example, triggering a switch) and gate positions detected by a tachometer, for smooth and substantially constant gate movement, which may be programmed to coordinate with strobing speed of the light curtains 604, 606 for both maximum speed of dimensioning and maximum resolution.

Furthermore, as will be described in detail below, the light emitters 602e and light receivers 602r may be configured with a particular spacing between multiple rows and may be operated in a particular sequence such that light or electrical interference does not cause false readings by the receivers 602r and thus interfere with the accuracy of the measurements. For example, the light emitters 602e may be operated such that adjacent light emitters 602e are not activated simultaneously or sequentially with adjacent emitters 602e in the same or an adjacent row.

The gate 106 may be used, in one embodiment, to simultaneously measure the dimensions of multiple objects situated on platform 102 in a single pass of the gate 106. This may require ensuring that the objects are disjoint in a radial direction and in a direction of the arc of travel of gate 106 as situated on the platform 102. In other words, there must be a sufficiently sized gap between each object such that the gap is detectable by the dimensioning sensors 108. As the gate 106 passes over the multiple objects, the dimensioning sensors 108 provide data that enables gaps between the objects to be detected. From this data, apparatus 100 determines the number of objects on the platform 102. In one embodiment, apparatus 100 automatically detects the number of objects on platform 102. In a further embodiment, a user of apparatus 100 may input the number of objects to be measured in a single pass of the gate 106, and apparatus 100 may verify that the number of objects input by the user matches the number of objects detected by apparatus 100. The dimensions for each of the multiple objects may then be determined.

Other gate 106 configurations are also contemplated herein. For example, the gate may be configured in different shapes such as circular or diamond shapes and may be configured in different sizes depending on the application. Furthermore, the gate 106 may be configured to be moved laterally in linear fashion across platform 102 rather than by pivoting or rotating the gate 106. For example, if a rectangular platform is used, the gate 106 may be configured to slide or roll in a straight line along the length of the rectangular platform while the dimensioning sensors 108 scan objects situated on the platform. However, such an arrangement requires additional hardware with consequent added weight and cost for the apparatus 100.

The apparatus 100 may also include a display 110 that acts as an interface to the system. The display 110 may include an input device such as a touch screen that enables a user to choose and initiate measurements, conduct calibration routines, and perform system performance checks. The display 110 may also display measurement results and graphics. In some embodiments, apparatus 100 may be configured to interface with a computing device such as a personal computer or laptop, or with an output device such as a printer. In such an embodiment, commands and measurement results may be passed between the computing device and the apparatus 100 via electronic communication channels.

In one embodiment, apparatus 100 includes a system controller (not depicted). The controller is programmed to initiate, handle, and process all measurement signals, as well as information from other peripheral devices such as barcode readers. After determining the dimensions of an object, the controller may output the resulting measurements and other relevant information to displays (e.g., display 110) and to communication ports that can interface with networks, computers, and other peripheral devices. The controller, or other peripheral device, may be used to calculate one or more of spatial volume and a dim-weight of an object based on the determined dimensions of the object.

Figure 6A:
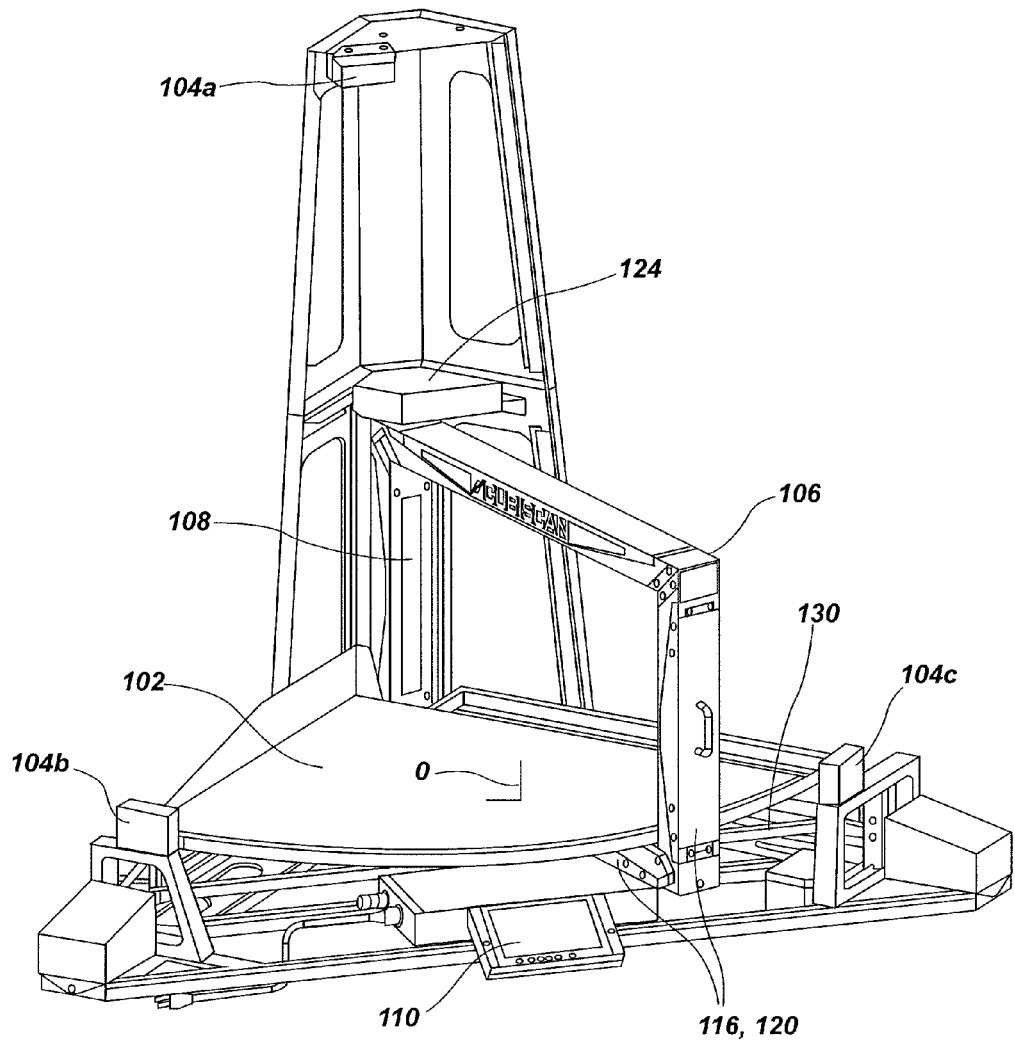
FIG. 6A comprises a perspective view of the embodiment of FIG. 1 with the gate of a dimensioning device traversing the apparatus platform during a dimensioning operation.

As noted above, platform 102 may be mounted to enable measurement of the weight of an object resting on the platform 102. In one embodiment, a plurality of load cell sensors may be used to determine the weight of the object on the platform 102. For example, a first load cell sensor may be configured on a scale frame 130 under the measuring platform 102 near the alignment corner 112 and two additional load cell sensors may be situated on the scale frame 130 near the outer edges of the surface of the platform 102. The signals from the load cell sensors may be combined in a load summing circuit to determine the weight of an object. In an embodiment where the dimensions of multiple objects are being measured, the weight of each object may be determined as each object is removed from (or added to) the platform 102 by calculating the amount of weight subtracted from (or added to) the total. As may be best appreciated from FIGS. 6A and 6B, gate 106 moves over, under and around platform 102 as it traverses its available arc of movement over object O, while moving through scale frame 130 between upper and lower beams thereof.

Figure 6B:
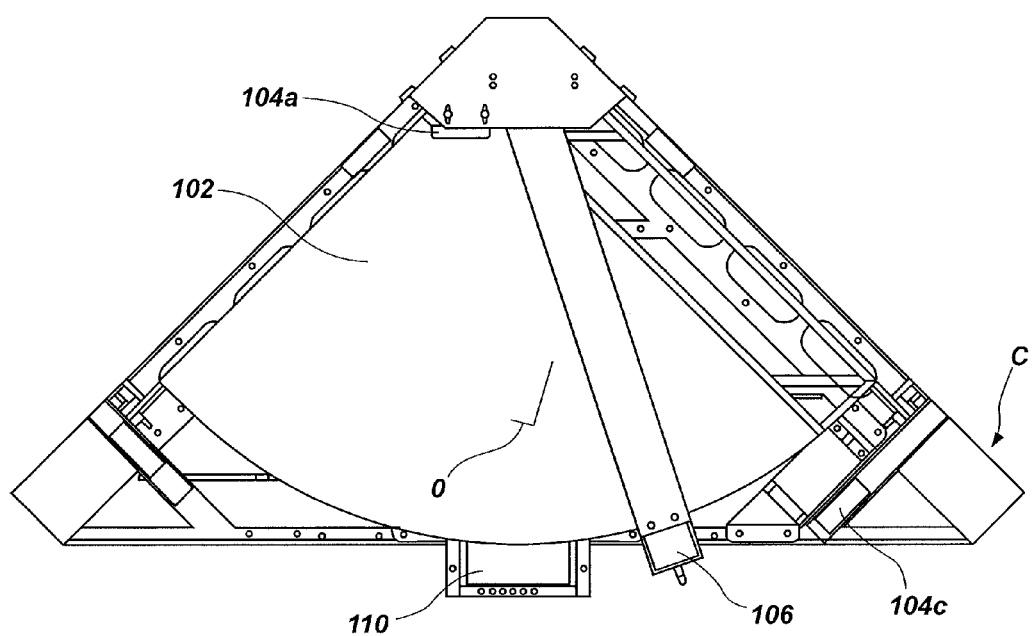
FIG. 6B comprises a top elevation of the embodiment of FIG. 1 with the gate of a dimensioning device traversing the apparatus platform during a dimensioning operation.
Figure 6C:
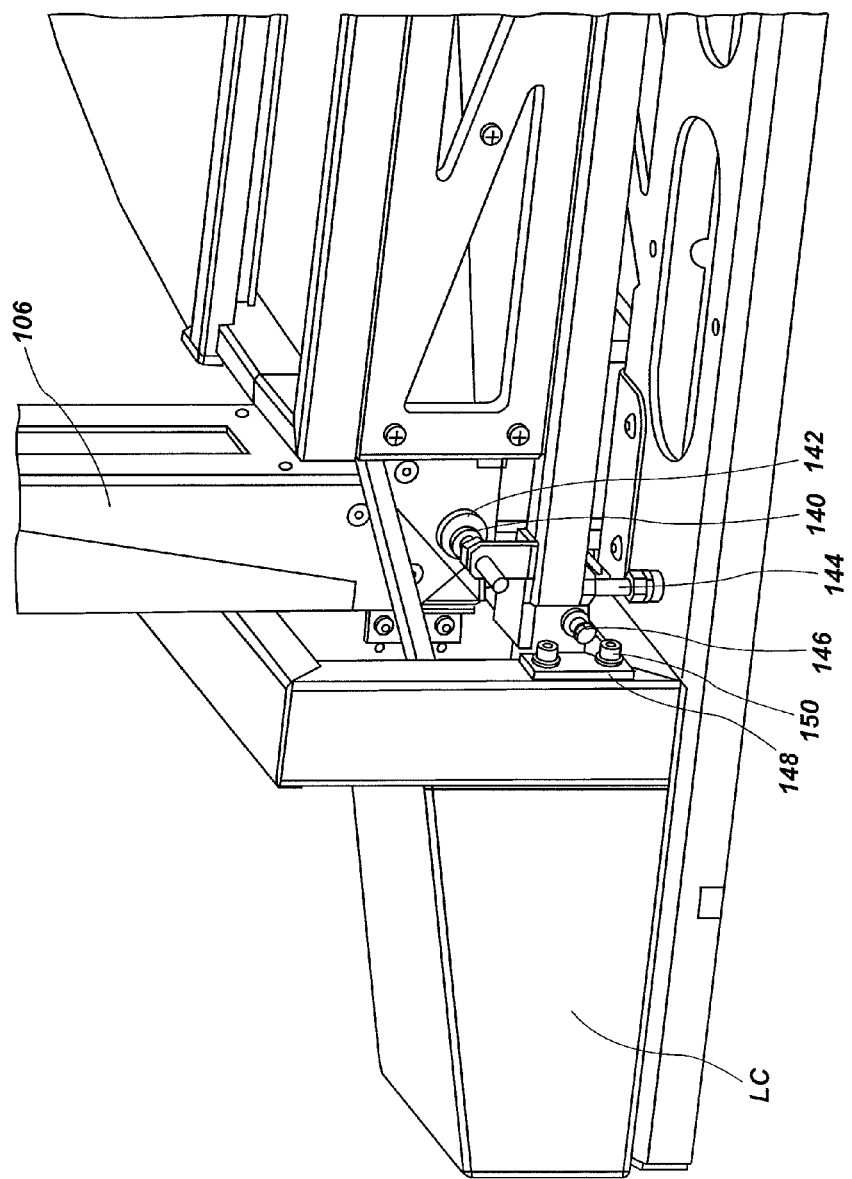
FIG. 6C comprises an enlarged perspective view of a portion of the embodiment of FIG. 1.

As shown in the enlarged perspective view of FIG. 6C, taken from a view perspective as indicated by arrow C on FIG. 6B, at the initial position of gate 106 is located gate stop adjust 140 to which magnet 142 on gate 106 is attracted to hold gate 106 in place against unwanted movement. Vertical movement of platform 102 beyond the limit of load cell LC in the adjacent housing is prevented by load cell stop adjust 144, and lateral movement is limited by two side stop adjusts 146 (one shown) on outer and inner sides of the lower beam of scale frame 130. Vertical adjustment is provided by slotted holes (not shown) by which the height of load cell lift off and stop bracket 148 may be adjusted with fasteners 150, as shown.

Figure 4:
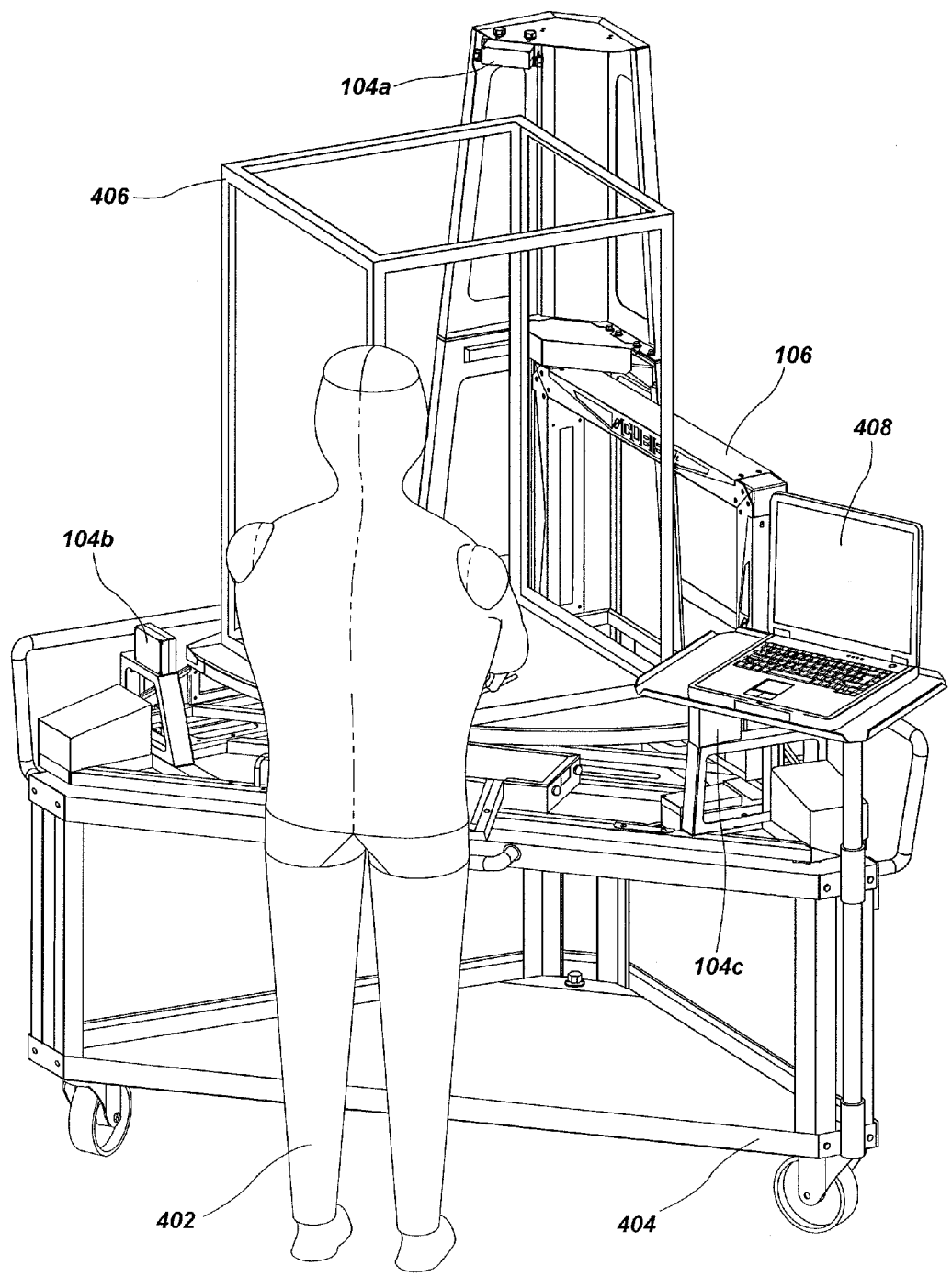
FIG. 4 comprises a perspective view of the embodiment of FIG. 1 in operation by a user.

FIG. 4 comprises a perspective view of the embodiment of the apparatus 100 of FIG. 1 in operation by a user 402. FIG. 4 depicts the relative size of the apparatus 100 with respect to a user in one embodiment. Of course, in further embodiments, the size of the apparatus 100 may be adjusted according the desired application. As depicted, the apparatus 100 is situated on a rolling table 404. Such an implementation enables the apparatus 100 to be transported from one location to another and enables the apparatus 100 to be stored when not in use.

Figure 5A:
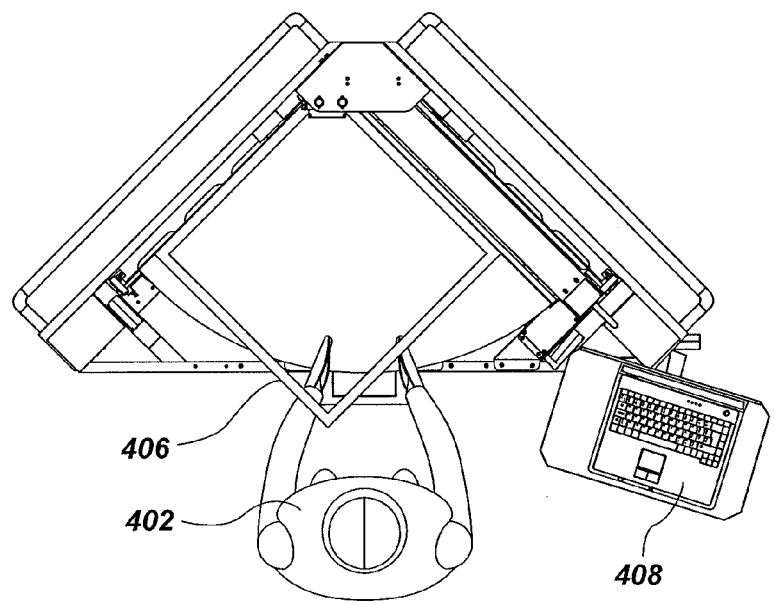
FIG. 5A comprises a top elevation of the embodiment of FIG. 1 in operation as shown in FIG. 4.
Figure 5B:
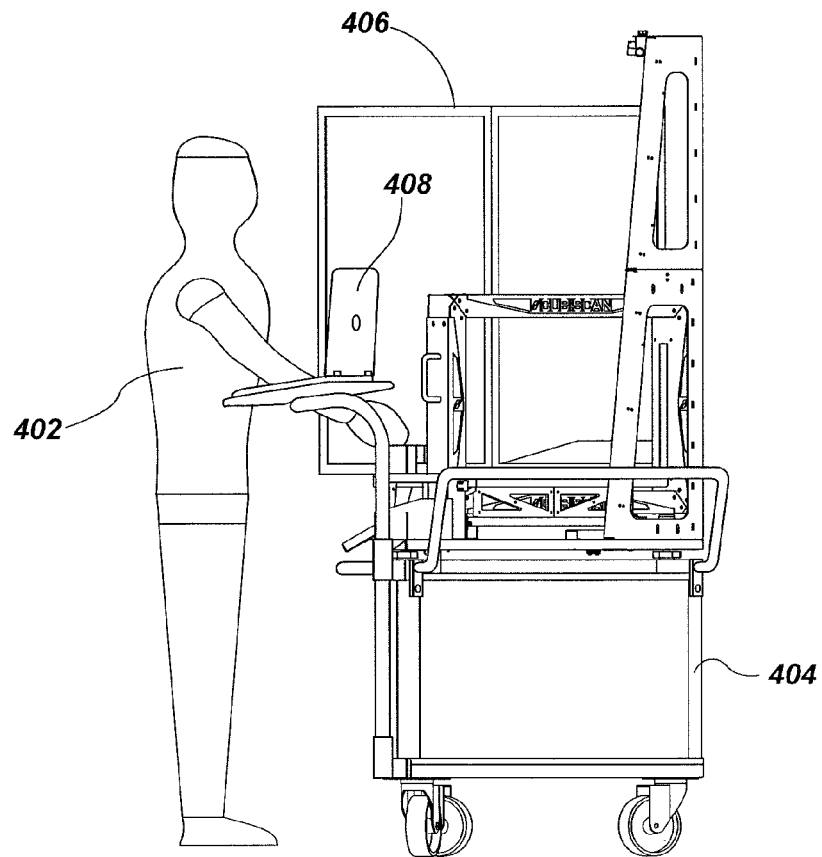
FIG. 5B comprises a side elevation of the embodiment of FIG. 1 in operation as shown in FIG. 4.
Figure 5C:
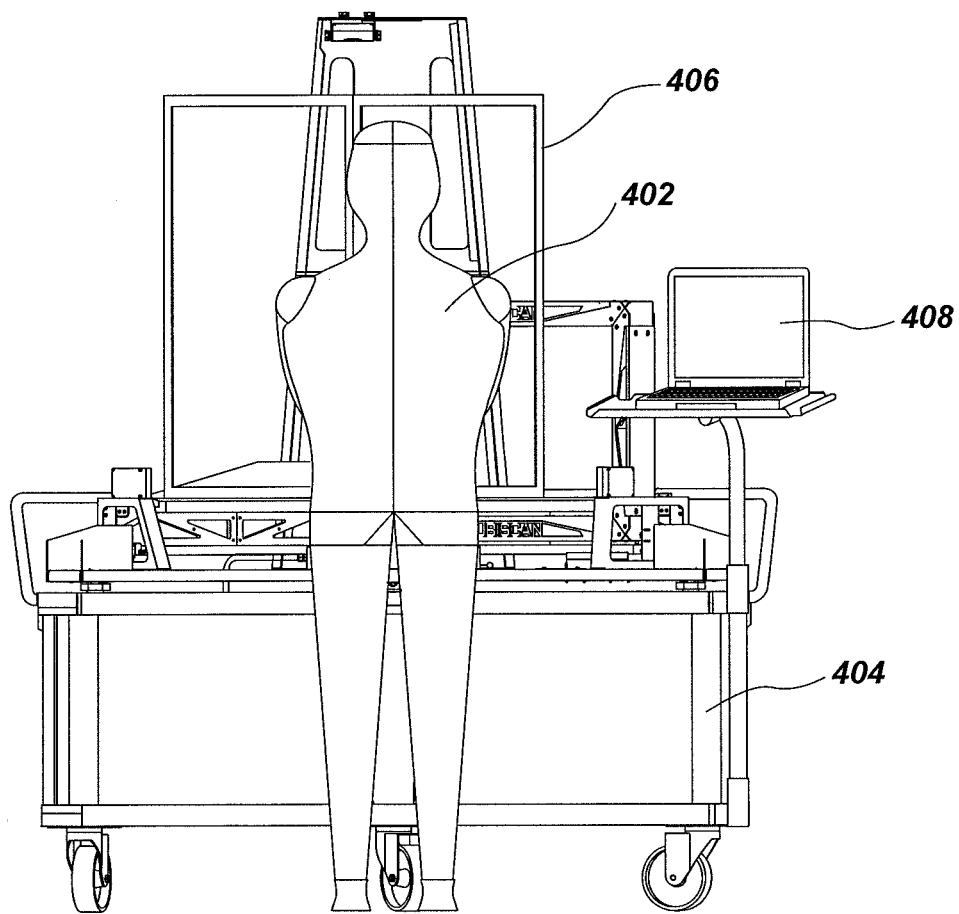
FIG. 5C comprises a frontal elevation of the embodiment of FIG. 1.

FIG. 4 further depicts one example of a cuboidal object 406. As depicted the cuboidal object 406 is too large for the gate 106 to pass around, so the gate 106 is moved to one side of platform 102 as shown (see FIG. 2A) so that the distance sensors 104a-104c are unobstructed and may be used to measure the dimensions of the object. Also depicted is a peripheral electronic device 408, illustrated as a laptop computer that may be used to interface with the apparatus 100. The peripheral device 408 may be used to give commands to the apparatus 100 and to store data and make calculations based on the measurement data returned by the apparatus 100. FIG. 5A comprises a top elevation of the embodiment of FIG. 4. FIG. 5B comprises a side elevation of the embodiment of FIG. 4.

FIG. 7A comprises an elevation of one embodiment of one of an array of light emitters 602e and light receivers 602r mounted on a board 600 in accordance with one embodiment of the present disclosure. FIG. 7B comprises an elevation of a side view of the gate 106 (FIG. 1) and depicts a vertical light curtain 604 and a horizontal light curtain 606 that are generated by light beams directed from light emitters 602e to corresponding light receivers 602r. FIG. 7C comprises a perspective view of an upper arm 114 and a vertical support 120 of the gate 106. The light emitters 602e may be LEDs and may be paired with correspondingly aligned light receivers 602r that are configured to detect light emitted from the LEDs. In the depicted embodiment, four rows of light emitters 602e are situated on a horizontal arm 114 and on a vertical support 120 of the gate 106. The depicted pattern of light emitters 602e is also representative of a corresponding pattern of light receivers (not pictured) situated opposite the array of light emitters 602e on another board 600 on an opposite horizontal arm 116 and on an opposite vertical support 118. As noted above, the positions of light emitters 602e and light receivers 602r may be reversed on opposing arms of gate 106. The pattern of light receivers 602r may be configured to mirror the pattern of light emitters 602e as depicted in the array on board 600.

The depicted embodiment of apparatus used for light curtains 604 and 606 comprises one or more light-emitter boards paired with one or more light-receiver boards. Specifically, in the depicted embodiment, two pairs of opposing light-emitter and receiver boards are located in series (longitudinally end to end) horizontally for vertical light curtain 604 and a single pair of opposing light-emitter and receiver boards is located vertically for horizontal light curtain 606. The number of boards employed is, of course, a function of the size of the object or objects to be measured and about which gate 106 is to pass. In the depicted embodiment, each emitter board has four arrays (which may also be characterized as lines or rows) of 80 light emitting elements in the form of LED light emitters 602e for a total of 320, and each light-receiver board 602r has four corresponding arrays (which may also be characterized as lines or rows) of 80 light receivers for a total of 320. Photo diodes may be employed as sensor elements of the light receivers. Although photo transistors may also be employed, photo diodes offer a faster response than photo transistors. The emitter and receiver elements within each array may be spaced 4 mm apart. For example, each light emitter 602e in a row (e.g., row 1) is spaced longitudinally about 4 mm from adjacent light emitters 602e on the same row. In one embodiment, the light emitters 602e in each row are equally spaced. As depicted, each row of light emitters 602e (and light receivers 602r in the paired receiver board) is laterally spaced about 7 mm from neighboring rows. The light emitters 602e and light receivers 602r in each row are staggered or offset longitudinally by about 1 mm from the nearest component in a neighboring row or rows, with light emitters 602e and light sensors of each row offset in the same longitudinal direction. For example, an end light emitter 602e of Row 1 is offset about 3 mm from a light emitter 602e at the corresponding longitudinal end of Row 4, as shown. Each light emitter 602e may be individually and independently operated such that a controller may activate light emitters 602e in a desired sequence.

Because of residual electrical and light noise, it may not be desirable to strobe the light emitters in a spatially sequential pattern (e.g., the first emitter in row 1, then the second emitter in row 1, then the third emitter in row 1, etc.). To overcome such problems, four disjoint (non-adjacent) LEDs may be sequentially strobed in a row, and then four disjoint LEDs may be strobed on each subsequent row. To speed up the strobing process, two or more LEDs on each board may be strobed simultaneously. In one embodiment, four LEDs may be strobed simultaneously. One example of a sequential strobing pattern strobing two LEDs simultaneously is as follows:

Component 0 and component 40 in row 1
Component 20 and component 60 in row 1
Component 0 and component 40 in row 2
Component 20 and component 60 in row 2
Component 0 and component 40 in row 3
Component 20 and component 60 in row 3
Component 0 and component 40 in row 4
Component 20 and component 60 in row 4
Component 1 and component 41 in row 1
Component 21 and component 61 in row 1
Component 1 and component 41 in row 2
Component 21 and component 61 in row 2
Etc.

To further speed up the process, every board in the system strobes corresponding components simultaneously. Therefore, when components or elements 0 and 40 in array (row, line) 1 on board 1 (assuming multiple boards in series) are strobing, components 0 and 40 in array (row, line) 1 on board 2 (and board 3, if more than two boards) are also strobing. Physical masking filters may be used to inhibit light interference among the various strobes.

Figure 8:
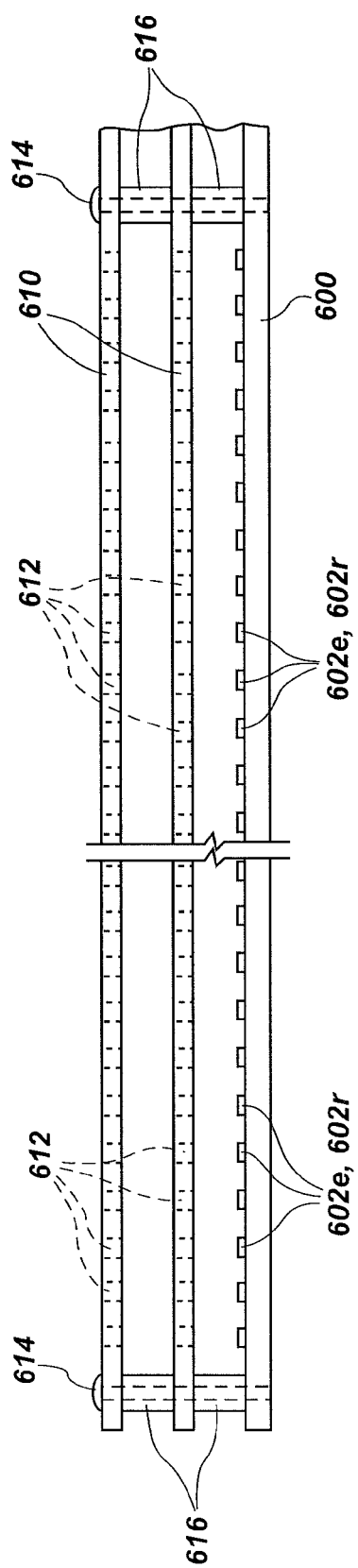
FIG. 8 is a side, partial sectional elevation of a portion of a light emitter board or a light receiver board having physical masking filters associated therewith in accordance with an embodiment of the disclosure.

In one embodiment, and as depicted in FIG. 8, the physical masking filters may comprise FR-4 one or more fiberglass filter boards 610 (two depicted) having a matte black finish applied thereto to render the boards opaque. Small apertures 612 of about 2.5 mm in diameter are formed through the filter boards 610 in the same patterns as the light emitters 602e and light receivers 602r on their respective boards 600. Two of the filter boards 610 are mounted in superimposition in front of each light emitter board 600 and each light receiver board 600, parallel to the plane of the associated emitter or receiver board 600 with each of the filter board apertures 612 aligned with an emitter or receiver element 602e or 602r of the associated emitter or receiver board 600. The first, closest filter board 610 to an associated emitter or receiver board 600 may be spaced from the associated board 600 by a standoff of, for example, about one-quarter inch (¼"). The second filter board 610 may, likewise, be spaced from the first filter board 610 by a standoff of, for example, about one-quarter inch (¼"). The filter system as described assists in directing the signal (light) beams from the light emitters 602e by blocking peripheral signal radiation on the emitter side. On the receiver side, the filter system blocks most light "noise" from other emitters, as well as ambient light in the area, from reaching receivers 602r. As distance between paired emitters and receivers is increased, the use of more filter boards 610 may be desirable to eliminate signal cross-talk and, similarly, the spacing between emitter or receiver boards 600 and associated filter boards 610 and filter board spacing may be adjusted as desirable. Conventional fasteners 614 extending perpendicular to the plane of the boards 600, 610 are employed to secure the filter boards 610 to the emitter and receiver boards 600, and tubular sleeves 616 surrounding the fasteners 614 and of the aforementioned one-quarter inch (¼") length may be employed between the boards 600, 610 to provide the desired standoff between the three boards 600, 610, 610 (emitter or receiver and two filter boards) in each stack of boards.

Strobing of emitters 602e in the manner described above results in increased accuracy of light and light interference detection due to the reduced risk of light or electronic noise interference. It should be noted that other strobing patterns are contemplated herein that may include simultaneously strobing some emitters 602e or spacing the emitters 602e in a spaced pattern such that the emitters 602e may be sequentially strobed. Furthermore, a different number of light emitters 602e, a different number of rows, and/or a different configuration or spacing of rows is also contemplated. Using an array of many rows with longitudinally offset light emitters 602e in the manner depicted enables greater resolution of the dimensions of the object being measured. By using multiple offset rows of emitters and activating each emitter 602e in a non-sequential pattern, resolution is not limited by the minimum required longitudinal spacing of light emitters 602e and associated receivers 602r in a single row. Thus, emitters 602e may be spaced closer together without light interference from one emitter/receiver pair to another.

Figure 9:
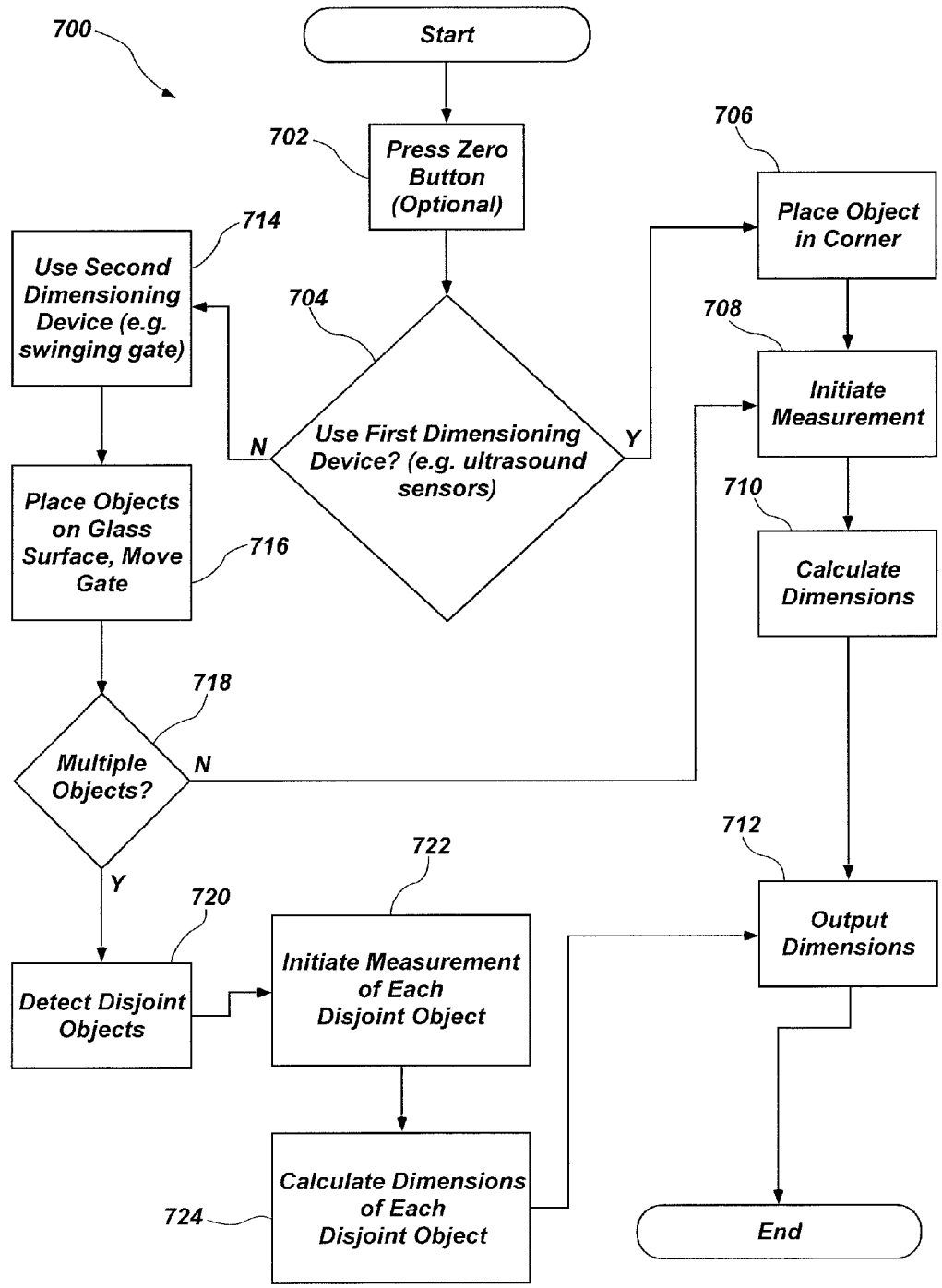
FIG. 9 comprises a flow diagram of an operating sequence of one embodiment of the present disclosure.

FIG. 9 comprises a flow diagram of an operating sequence of one embodiment of a method 700 of operating the apparatus in accordance with the present disclosure. The method 700 begins by optionally pressing 702 a zero button to zero out all preceding measurements and/or to zero the measuring devices including dimensioning devices and weighing devices. Initiation of method 700 or a segment thereof may also be effected by a command from a peripheral device, such as a computer, or by a host server via a network. It is then determined 704 whether to use the first dimensioning device (e.g., ultrasound sensors). Typically, a user selects which dimensioning device to use.

If the first dimensioning device is selected, the object to be measured is placed 706 in the corner 112 of the platform 102. The measurement is initiated 708 by input of a measure command such as by pressing a measure button or, again, by command from a processor. This causes the distance sensors 104a-104c to measure the distance from each sensor 104a-104c to a face of the object being measured. From this information, the dimensions of the object are calculated 710. Subsequently, the dimensions may be output 712. The output may be provided to a display, to a peripheral device, to a controller, or other device.

If the first dimensioning device is not selected, then the second dimensioning device (swinging gate) is used 714. To use the second dimensioning device, one or more objects are placed 716 on the surface of the platform 102 and the gate 106 is rotationally moved across the platform 102 so that the dimensioning sensors 108 carried by the gate arms 114, 116 and gate supports 118, 120 may determine the dimensions of the object(s). Gate 106 may be moved completely through its arc of travel across platform 102, or only through a smaller arc sufficient to pass over the object or objects to be measured and resting on platform 102, saving time and increasing throughput. The sensors 108 may include light emitters 602e and associated, aligned light receivers 602r that transmit signals from one arm 114, 116 of the gate 106 to another, opposing arm 114, 116 of the gate 106 and from one support 118, 120 to another, opposing support 118, 120 as the gate 106 passes over and about the one or more objects. Next, it is determined 718 if there are multiple objects being measured. If not, then measurement of the single object is initiated 708, the dimensions are calculated 710, and the dimensions are output 712.

If it is determined 718 that there are multiple objects to measure, then disjoint objects are detected 720 based on information from the dimension sensors 108 of the gate 106. Information from the dimension sensors 108 may be correlated with a rotational position of the swinging gate 106 to determine the number of objects and measurements for the objects. Thus, once multiple objects are detected 720, a measurement of each object may be initiated 722. The dimensions of each disjoint object may then be calculated 724 and the dimensions may be output 712. In one embodiment, the detection of multiple objects and measurement of the objects' dimensions is performed in a single pass of the gate 106.

Figure 10:
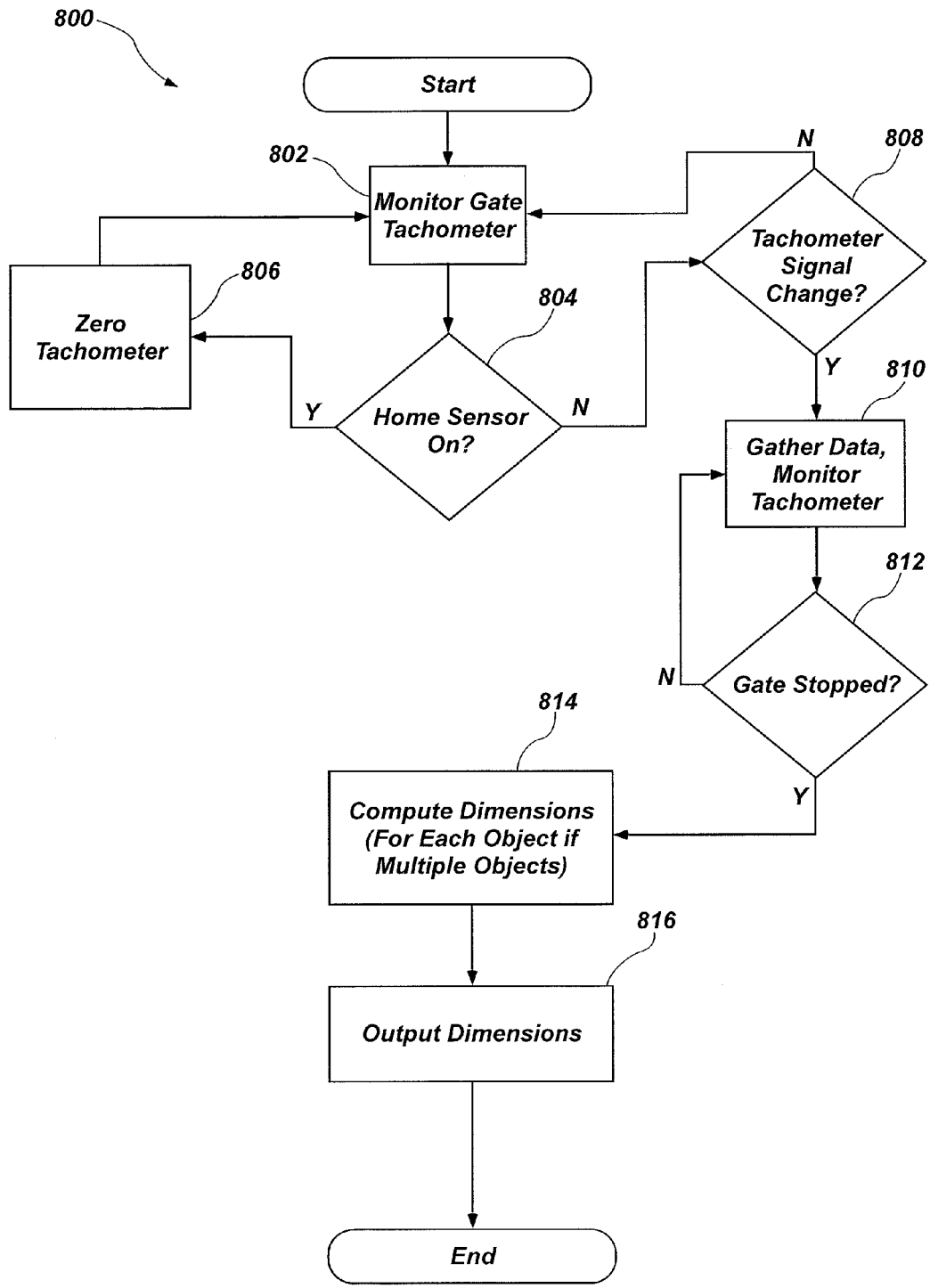
FIG. 10 comprises a flow diagram of an operating sequence of one embodiment of a swinging gate dimensioning device.

FIG. 10 comprises a flow diagram of the operating sequence of one embodiment of a method 800 of operating a dimensioning device using a rotationally movable gate 106. The method 800 begins by monitoring 802 a gate tachometer. The gate tachometer or other suitable rotational position determination sensor determines incremental rotational positions of the gate 106 as it rotates across the platform 102. It is determined 804 whether a home sensor for the swinging gate is on. (i.e., is the gate in its starting position?) The apparatus 100 may include a sensor such as a switch in the form of a mechanical or proximity switch that detects when the swinging gate is at its starting position.

If the home sensor is on, the tachometer may be zeroed 806 prior to initiating a new rotation of the gate 106. Zeroing 806 the tachometer ensures that data from the dimensioning sensors 108 (e.g., light emitter/receiver pairs) of the gate 106 is accurately correlated with the rotational position of the swinging gate 106 so that data about the surface and shape of the object being measured is accurately recorded.

If it is determined 804 that the home sensor is not on (e.g., the gate 106 is not at its starting position), the tachometer is monitored 808 for a signal change. (Is the tachometer moving or has it stopped?) If it is determined 808 that the tachometer is not changing its signal (e.g., the gate 106 is stopped in a position other than its starting position), then the method 800 returns to act 802 of monitoring the tachometer for detection of the home sensor.

If it is determined 808 that the tachometer signal is changing (e.g., the gate 106 is being rotated), then data is gathered 810 from the dimensional sensors 108 (e.g., receivers associated with light emitters 602e) and from the tachometer. Next, it is determined 812 whether the gate 106 has stopped rotating. If it is still rotating, then data is continuously gathered 810 and recorded. If the gate 106 has stopped rotating, the dimensions of the object are computed 814. If there are multiple objects, then the dimensions of each object are computed 814. Finally, the computed 814 dimensions are output 816.

Figure 11:
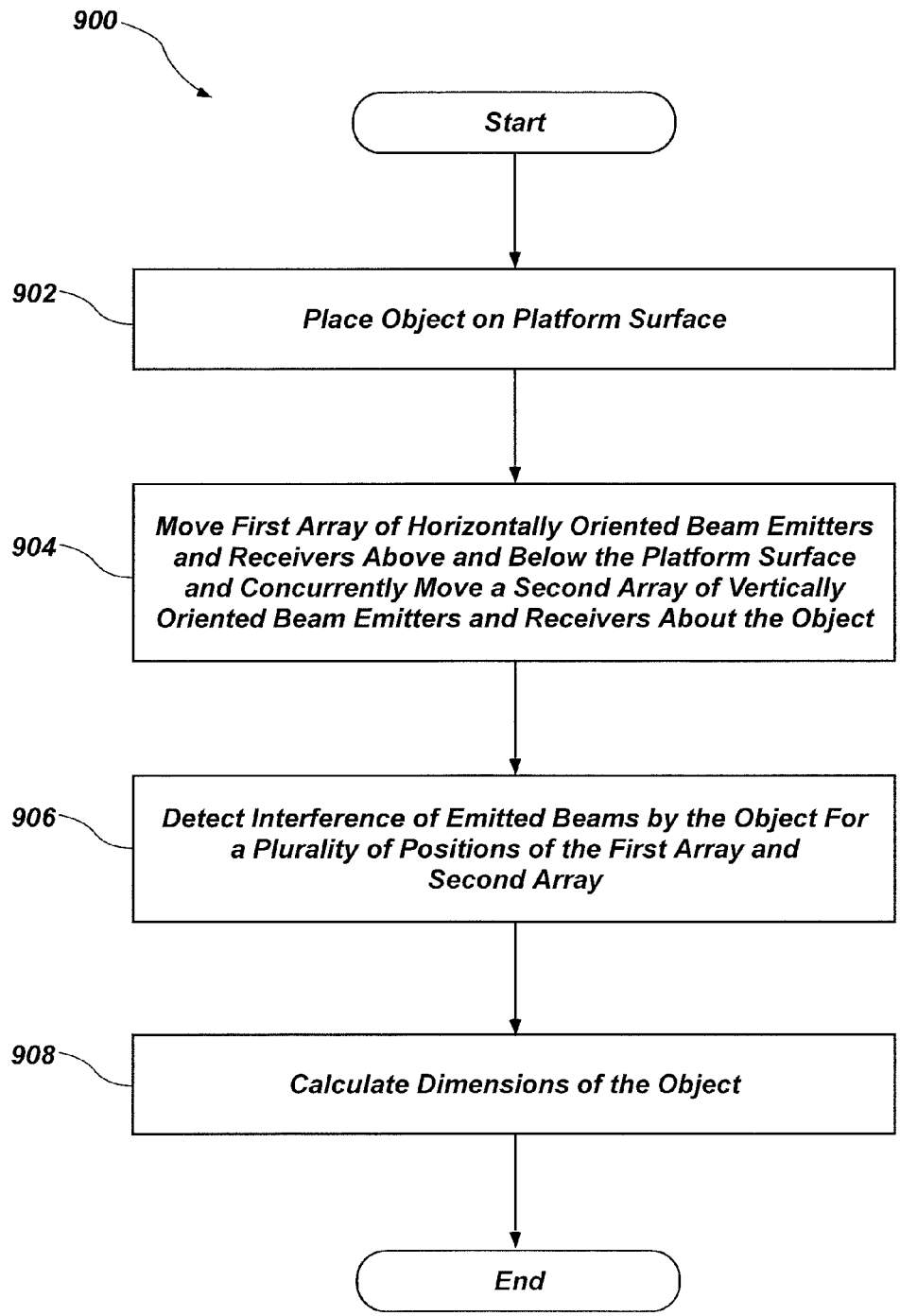
FIG. 11 comprises a flow diagram of an operating sequence of another embodiment of a swinging gate dimensioning device.

FIG. 11 comprises a flow diagram of the operating sequence of one embodiment of a method 900 of operating a rotationally movable gate 106. The method 900 begins by placing 902 an object on a surface of platform 102. The platform 102 may be transparent such that light signals are able to pass through the material from which the platform 102 is made. A first array of horizontally oriented beam emitters 602e and receivers 602r is moved 904 above and below the platform surface such that emitted beam signals pass from beam emitters 602e on one side of the plane of the platform surface to beam receivers 602r on an opposing side of the platform surface. Similarly, a second array of vertically oriented beam emitters 602e and receivers 602r is concurrently moved 904 about the object on the platform 102. Signals from the vertically oriented beam emitters 602e are directed toward corresponding beam receivers 602r.

The signals may be interrupted or blocked by the object on the platform 102. Interference of the emitted beams is detected 906 by the receivers when an expected beam fails to reach the proper, aligned receiver. Detection 906 of the interference of emitted beams is recorded for each of a plurality of positions of the first and second arrays of paired emitters and receivers. Based on the detected interference and the corresponding positions of the first and second arrays, the dimensions of the object are calculated 908.

It should be noted that these methods may include additional acts (such as weighing objects) or the like that are not depicted herein. Further, these methods may be practiced in some embodiments with fewer acts or in a different order than are shown. It is thus apparent that a novel and unobvious measuring method and apparatus has been described in a variety of embodiments. Many additions, deletions, and modifications to the preferred embodiments may be made without departing from the scope of the disclosure as hereinafter claimed. Further, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus for determining dimensions of an object, comprising:
   a platform having a horizontal surface for supporting an object thereon; and
   a dimensioning device comprising a gate configured as a frame having an upper arm above the platform opposite a lower arm below the platform and having opposing side supports extending vertically between the upper arm and lower arm, wherein the gate is mounted for rotational movement in a horizontally traversing arc to enable the upper and lower arms to respectively and simultaneously pass over and under the platform, and wherein the arms of the gate respectively carry a plurality of mutually aligned emitters and receivers and wherein the side supports of the gate respectively carry a plurality of mutually aligned emitters and receivers.

2. The apparatus of claim 1, further comprising a hinge device supporting the gate and enabling rotation of the gate in the movement in the horizontally traversing arc.

3. The apparatus of claim 2, wherein the hinge device enables rotation of the gate about a substantially vertical axis of rotation at least adjacent a side support.

4. The apparatus of claim 3, wherein the platform comprises two mutually perpendicular linear edges having proximate ends meeting at a corner adjacent the vertical axis of rotation, and a curved edge remote from the axis of rotation and extending between remote ends of each of the linear edges.

5. The apparatus of claim 1, wherein the platform is transparent, and the plurality of emitters comprises a plurality of light signal emitters on one of the upper arm and the lower arm and a plurality of light signal receivers on the other of the upper arm and the lower arm.

6. The apparatus of claim 5, wherein the plurality of emitters further comprises a plurality of light signal emitters on one of one side support and the opposing side support and comprises a plurality of light signal receivers on the other of the one side support and the opposing side support.

7. The apparatus of claim 1, wherein the plurality of emitters comprises a plurality of light signal emitters configured in one or more rows of equally spaced light emitters and wherein the plurality of light signal receivers is configured in one or more rows of equally spaced light receivers, an arrangement of the one or more rows of light signal receivers mirroring an arrangement of the one or more rows of light signal emitters.

8. The apparatus of claim 7, wherein the plurality of light signal emitters is configured in two or more rows, and wherein light signal emitters of each row of light signal emitters are longitudinally offset from light signal emitters of any adjacent row of light signal emitters.

9. The apparatus of claim 7, wherein each light signal emitter is individually operable independent from any other light signal emitter.

10. The apparatus of claim 7, wherein each light signal emitter in a common row is equally spaced at between about 3 mm and about 5 mm apart.

11. The apparatus of claim 7, wherein each row of light signal emitters is equally laterally spaced from any adjacent row of light signal emitters at between about 6 mm and about 8 mm apart.

12. The apparatus of claim 7, further comprising physical masking filters associated with at least one of the plurality of light signal emitters and the plurality of light signal receivers, the physical masking filters located and configured to block light unassociated with a respective light signal emitter as received by an aligned light signal receiver.

13. The apparatus of claim 1, wherein the plurality of emitters comprises light emitting diodes ("LEDs").

14. The apparatus of claim 1, further comprising a rotational sensor configured to detect rotational positions of the gate within the horizontally traversing arc.

15. The apparatus of claim 14, further including an electronic computing device for calculating one or more of a spatial volume and a dim-weight of an object responsive to input from the receivers in combination with associated rotational positions within the horizontally traversing arc detected by the rotational sensor.

16. The apparatus of claim 1, further comprising a weight measuring device located and configured to measure a weight of an object situated on the platform.

17. The apparatus of claim 16, wherein the weight measuring device supports the platform independent of the dimensioning device.

18. The apparatus of claim 17, wherein the weight measuring device comprises only three load cells supporting a scale frame carrying the platform.

19. A method for determining dimensions of one or more objects using a dimensioning device comprising a structure bearing dimensioning sensors including horizontally and vertically mounted cooperative beam emitters and receivers and mounted for movement in an arc in a plane of a substantially transparent platform, the method comprising:
   placing one or more objects on a surface of the substantially transparent platform;
   measuring dimensions of the one or more objects using the dimensioning device by moving a frame structure in an arc of movement in the plane of the substantially transparent platform and about the one or more objects while emitting beams from beam emitters at a plurality of rotational positions of the structure within the arc of movement to cause the beams to be interrupted by the one or more objects and detecting the interruptions by the cooperative receivers at the plurality of rotational positions, uninterrupted beams from the horizontally mounted beam emitters passing through the substantially transparent platform to the cooperative, horizontally mounted receivers;
   retrieving data responsive to the detected interruptions from the receivers of the dimensioning sensors in association with the plurality of rotational positions; and
   determining dimensions of the one or more objects based on a correlation between the plurality of rotational positions of the structure and the associated data.

20. The method of claim 19, wherein placing one or more objects on the surface of the substantially transparent platform comprises placing multiple disjoint objects on the surface and determining the dimensions of each of the multiple disjoint objects based on a correlation between the plurality of rotational positions of the structure and the associated data.

21. The method of claim 19, further comprising determining a weight of the one or more objects substantially concurrently with measuring the dimensions thereof.

22. The method of claim 19, further comprising calculating one or more of a spatial volume of the one or more objects from the determined dimensions and calculating a dim-weight for the one or more objects.

23. The method of claim 19, wherein emitting beams further comprises sequentially turning on one or more non-adjacent beam emitters in a first row of beam emitters at each of the plurality of rotational positions.

24. The method of claim 19, wherein measuring the dimensions of the object further comprises sequentially turning on one or more non-adjacent beam emitters in a first row of beam emitters before sequentially turning on one or more non-adjacent beam emitters in a second row of beam emitters.

* * * * *

UNITED STATES PATENT AND TRADEMARK OFFICE
CERTIFICATE OF CORRECTION

PATENT NO. : 9,581,432 B2
APPLICATION NO. : 14/579901
DATED : February 28, 2017
INVENTOR(S) : Robert L. Kennington et al.

Page 1 of 1

It is certified that error appears in the above-identified patent and that said Letters Patent is hereby corrected as shown below:

In the Specification

| | | |
|---|---|---|
| Column 1, | Line 56, | change "object weight" to --object weight and dimensions is useful for determining box size, durability, packing sequence and product orientation.-- |
| Column 1, | Lines 58-60, | delete "BRIEF SUMMARY and dimensions is useful for determining box size, durability, packing sequence and product orientation." |
| Column 1, | Line 58, | insert heading --BRIEF SUMMARY-- prior to the paragraph beginning "A quick, accurate" |

Signed and Sealed this
Second Day of January, 2018

Joseph Matal
*Performing the Functions and Duties of the
Under Secretary of Commerce for Intellectual Property and
Director of the United States Patent and Trademark Office*